Figure 1:
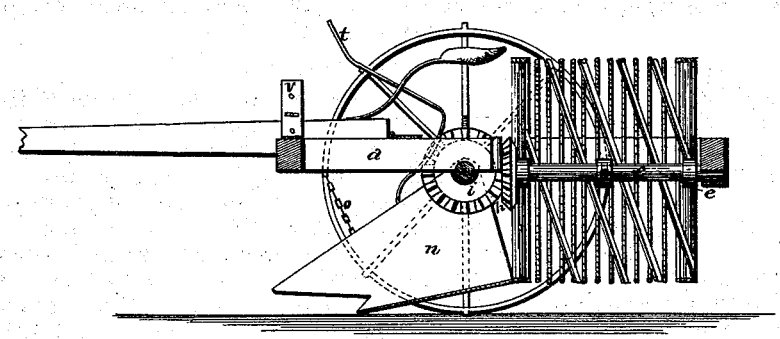
Figure 2:
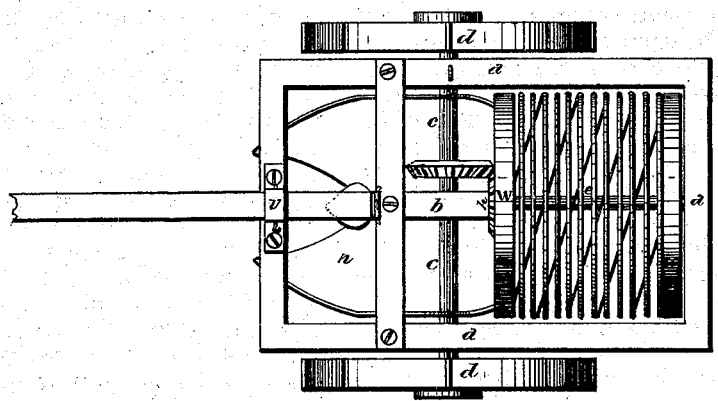
Figure 3:
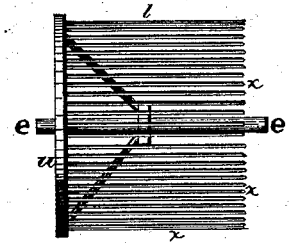

D. FULKERSON.
Potato-Diggers.

No. 156,249.

Patented Oct. 27, 1874.

WITNESSES.
J. W. Zarner,
T. F. Lehmann

INVENTOR.
D. Fulkerson
per
F. A. Lehmann, Atty.

UNITED STATES PATENT OFFICE.

DARIUS FULKERSON, OF SUGAR GROVE, PENNSYLVANIA, ASSIGNOR OF TWO-THIRDS HIS RIGHT TO C. S. MIDDLETON AND JAMES B. ABBOTT, OF SAME PLACE.

IMPROVEMENT IN POTATO-DIGGERS.

Specification forming part of Letters Patent No. 156,249, dated October 27, 1874; application filed October 5, 1874.

*To all whom it may concern:*

Be it known that I, DARIUS FULKERSON, of Sugar Grove, in the county of Warren and State of Pennsylvania, have invented certain new and useful Improvements in Potato-Diggers; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in potato diggers; and consists in a separator for separating the potatoes from the dirt, consisting of a driving-shaft, to which is secured a suitable ring or rim at the front end, having a number of horizontal parallel spring rods or bars projecting from its rear side, the rear ends of which bars being left free, so that the weight of the potatoes and dirt will cause them to incline downward, as will be more fully described hereafter.

The accompanying drawing represents my invention.

*a* represents a rectangular frame, made of iron or wood, and which is pivoted upon the axle *c*, which axle is rigidly connected to the two driving-wheels *d*, so that, when they revolve, it will revolve with them. Extending backward past the axle, from the middle of the front part of the frame, is the beam *b*, the rear end of which is supported rigidly in position upon the axle. Secured to this axle is a bevel wheel, *i*, which meshes with a similar wheel, *h*, on the front end of the shaft *e*, which shaft has its front end journaled in the rear end of the beam, while its rear end is journaled upon the rear cross-bar of the frame. To this shaft is attached a circular wire-separator or frame, *w*, which revolves with the shaft. Inside of this separator, which may be of any suitable construction, are a number of spiral flanges, which serve to force the potatoes back through the separator and out its rear end. The rear journal of the shaft is made to readily open, so that this cylinder can be removed at any time for repairs or for the purpose of replacing it by the separator *l*. The separator *l*, which is intended more especially for use in heavy soil, consists of a ring, *u*, which is secured to its shaft by suitable braces. Extending horizontally backward from the rear edge of the ring are a number of steel springs or wires, *x*, which are left entirely free at their rear ends. The weight of the earth and potatoes bend these ends downward, and thus form an incline, down which the potatoes readily pass. Pivoted upon the axle is the semicircular scoop *n*, which has its front end supported by the chains *o*, and to which is attached the hand-lever *i*, by which it can be raised up from the earth out of the way while the machine is being transported from one place to another. This scoop has three prongs or points formed upon its front edge, the outer ones of which project beyond the central steel pointed one. These points gather up the potatoes from the earth, and they are then passed backward into the separator, where they are separated from the earth. The rear end of the tongue is hinged or coupled to the top of the beam *b*, so that it can be raised freely up and down. Extending upward from the top of the front cross-bar of the frame, upon each side of the tongue, are the bars *v*, which have a number of holes through them, through which holes pins are passed. By pressing or tilting downward the front end of the frame to any desired extent, and then passing pins through above and below the tongue, the rear end of the separator will be raised to control the passage of the potatoes through it.

I am aware that a revolving separator, supported in a frame, and operated by shafts which receive their motion from gears placed upon the wheels, is not new. My invention consists in dispensing with all intermediate gearing, and operating the separator by the axle alone.

Having thus described my invention I claim—

The rotary-separator *l*, consisting of the shaft *e*, ring *u*, and rods or wires *x*, the rear ends of the rods being left free, so that the weight of the potatoes and dirt will cause them to incline downward, substantially as described.

In testimony that I claim the foregoing I have hereunto set my hand this 1st day of October, 1874.

DARIUS FULKERSON.

Witnesses:
C. S. MIDDLETON,
D. W. BIRD.